US009872066B2

(12) United States Patent
Iannuzzelli

(10) Patent No.: US 9,872,066 B2
(45) Date of Patent: Jan. 16, 2018

(54) METHOD FOR STREAMING THROUGH A DATA SERVICE OVER A RADIO LINK SUBSYSTEM

(75) Inventor: Russell Iannuzzelli, Bethesda, MD (US)

(73) Assignee: Ibiquity Digital Corporation, Columbia, MD (US)

( * ) Notice: Subject to any disclaimer, the term of this patent is extended or adjusted under 35 U.S.C. 154(b) by 1939 days.

(21) Appl. No.: 11/958,783

(22) Filed: Dec. 18, 2007

(65) Prior Publication Data

US 2009/0157412 A1    Jun. 18, 2009

(51) Int. Cl.

| G10L 21/00 | (2013.01) |
|---|---|
| H04N 21/44 | (2011.01) |
| H04N 21/234 | (2011.01) |
| H04N 21/439 | (2011.01) |
| H04H 60/07 | (2008.01) |

(52) U.S. Cl.
CPC . *H04N 21/44004* (2013.01); *H04N 21/23406* (2013.01); *H04N 21/4392* (2013.01); *H04H 60/07* (2013.01); *H04H 2201/183* (2013.01); *H04H 2201/186* (2013.01)

(58) Field of Classification Search
CPC .............. G10L 19/24; H04N 19/00193; H04N 7/26186; H04N 7/26941
USPC ......................................................... 370/477
See application file for complete search history.

(56) References Cited

U.S. PATENT DOCUMENTS

| 6,028,896 | A  | * | 2/2000  | Jang ..................... H04N 19/197 370/537 |
|---|---|---|---|---|
| 6,104,700 | A  | * | 8/2000  | Haddock ............. H04L 12/5693 370/235 |
| 6,332,119 | B1 |   | 12/2001 | Hinderks |
| 6,678,243 | B2 |   | 1/2004  | Sartain et al. |
| 7,170,938 | B1 | * | 1/2007  | Cote et al. ............... 375/240.03 |
| 7,305,043 | B2 |   | 12/2007 | Milbar et al. |
| 2002/0085489 | A1 |   | 7/2002  | Sartain et al. |
| 2002/0141365 | A1 | * | 10/2002 | Leung .................... H04L 12/189 370/335 |
| 2003/0002588 | A1 | * | 1/2003  | Faller ............................. 375/242 |
| 2003/0061038 | A1 |   | 3/2003  | Faller |
| 2003/0152151 | A1 |   | 8/2003  | Hsieh et al. |
| 2003/0206558 | A1 | * | 11/2003 | Parkkinen et al. ........... 370/477 |
| 2003/0223506 | A1 |   | 12/2003 | Cameron et al. |

(Continued)

FOREIGN PATENT DOCUMENTS

| EP | 0692914 A2 | 1/1996 |
|---|---|---|
| WO | WO2004088933 A1 | 10/2004 |
| WO | WO2005050881 A1 | 6/2005 |

OTHER PUBLICATIONS

Frank Hofmann et al., "Digital Radio Mondiale (DRM) Digital Sound Broadasting in the AM Bands", 2003, IEEE, pp. 319-328.*

(Continued)

*Primary Examiner* — Richemond Dorvil
*Assistant Examiner* — Mark Villena
(74) *Attorney, Agent, or Firm* — Schwegman Lundberg & Woessner, P.A.

(57) ABSTRACT

An apparatus for controlling a data rate in a data client for a digital audio broadcasting system includes a buffer for storing data, a codec for coding data, and a control module for controlling a bit rate of the codec in response to a level of the data in the buffer. A method performed by the apparatus is also included.

20 Claims, 13 Drawing Sheets

(56) References Cited

U.S. PATENT DOCUMENTS

| | | | |
|---|---|---|---|
| 2004/0213346 A1* | 10/2004 | Matsumura et al. | 375/240.03 |
| 2006/0009967 A1* | 1/2006 | Gerrits et al. | 704/200 |
| 2006/0120466 A1* | 6/2006 | Yoshinari et al. | 375/259 |
| 2006/0133809 A1* | 6/2006 | Chow et al. | 398/66 |
| 2006/0218264 A1* | 9/2006 | Ogawa et al. | 709/223 |
| 2006/0259297 A1* | 11/2006 | Heiman et al. | 704/229 |
| 2007/0025441 A1* | 2/2007 | Ugur et al. | 375/240.03 |
| 2007/0133441 A1 | 6/2007 | Kang | |
| 2007/0168579 A1* | 7/2007 | Croughwell, III | G06F 13/28 710/22 |
| 2008/0126082 A1* | 5/2008 | Ehara et al. | 704/205 |
| 2009/0306992 A1* | 12/2009 | Ragot et al. | 704/500 |

OTHER PUBLICATIONS

National Radio Systems Committee, NRSC-5-A, In-band/on-channel Digital Radio Broadcasting Standard, Sep. 2005, 42 pgs.

\* cited by examiner

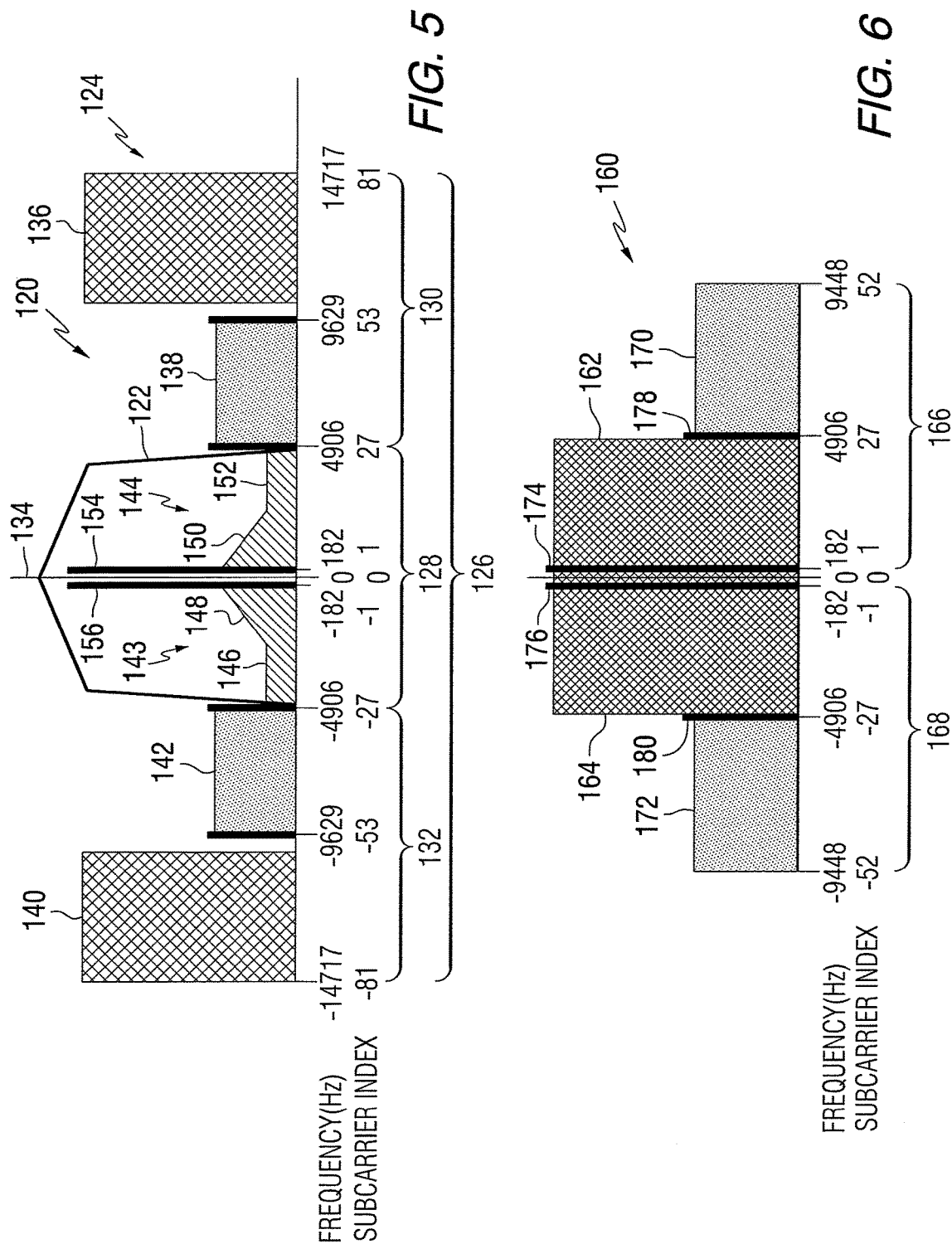

METHOD FOR STREAMING THROUGH A DATA SERVICE OVER A RADIO LINK SUBSYSTEM

FIELD OF THE INVENTION

This invention relates to methods and apparatus for controlling data, and more particularly, to the application of such methods and apparatus for streaming in a data subsystem of a digital audio broadcasting system.

BACKGROUND OF THE INVENTION

Digital radio broadcasting technology delivers digital audio and data services to mobile, portable, and fixed receivers. One type of digital radio broadcasting, referred to as in-band on-channel (IBOC) digital audio broadcasting (DAB), uses terrestrial transmitters in the existing Medium Frequency (MF) and Very High Frequency (VHF) radio bands. HD Radio™ technology, developed by iBiquity Digital Corporation, is one example of an IBOC implementation for digital radio broadcasting and reception. IBOC DAB signals can be transmitted in a hybrid format including an analog modulated carrier in combination with a plurality of digitally modulated carriers or in an all-digital format wherein the analog modulated carrier is not used. Using the hybrid mode, broadcasters may continue to transmit analog AM and FM simultaneously with higher-quality and more robust digital signals, allowing themselves and their listeners to convert from analog-to-digital radio while maintaining their current frequency allocations.

One feature of digital transmission systems is the inherent ability to simultaneously transmit both digitized audio and data. Thus the technology also allows for wireless data services from AM and FM radio stations. The broadcast signals can include metadata, such as the artist, song title, or station call letters. Special messages about events, traffic, and weather can also be included. For example, traffic information, weather forecasts, news, and sports scores can all be scrolled across a radio receiver's display while the user listens to a radio station.

The design provides a flexible means of transitioning to a digital broadcast system by providing three new waveform types: Hybrid, Extended Hybrid, and All-Digital. The Hybrid and Extended Hybrid types retain the analog FM signal, while the All-Digital type does not. All three waveform types conform to the currently allocated spectral emissions mask.

The digital signal is modulated using Orthogonal Frequency Division Multiplexing (OFDM). OFDM is a parallel modulation scheme in which the data stream modulates a large number of orthogonal subcarriers, which are transmitted simultaneously. OFDM is inherently flexible, readily allowing the mapping of logical channels to different groups of subcarriers.

The HD Radio system allows multiple services to share the broadcast capacity of a single station. One feature of digital transmission systems is the inherent ability to simultaneously transmit both digitized audio and data. Thus the technology also allows for wireless data services from AM and FM radio stations. First generation (core) services include a Main Program Service (MPS) and the Station Information Service (SIS). Second generation services, referred to as Advanced Application Services (AAS), include information services providing, for example, multicast programming, electronic program guides, navigation maps, traffic information, multimedia programming and other content. The AAS Framework provides a common infrastructure to support the developers of these services. The AAS Framework provides a platform for a large number of service providers and services for terrestrial radio. It has opened up numerous opportunities for a wide range of services (both audio and data) to be deployed through the system.

The National Radio Systems Committee (NRSC), a standard-setting organization sponsored by the National Association of Broadcasters and the Consumer Electronics Association, adopted an IBOC standard, designated NRSC-5A, in September 2005. NRSC-5A, the disclosure of which is incorporated herein by reference, sets forth the requirements for broadcasting digital audio and ancillary data over AM and FM broadcast channels. The standard and its reference documents contain detailed explanations of the RF/transmission subsystem and the transport and service multiplex subsystems. Copies of the standard can be obtained from the NRSC. iBiquity's HD Radio technology is an implementation of the NRSC-5A IBOC standard.

The HD Radio system includes a radio link subsystem that is designed primarily for data transmission. It would be desirable to utilize the radio link subsystem to transmit streaming data such as audio and video.

SUMMARY OF THE INVENTION

In one aspect, the invention provided an apparatus for controlling a data rate in a data client for a digital audio broadcasting system including a buffer for storing data, a codec for coding data, and a control module for controlling a bit rate of the codec in response to a level of the data in the buffer.

In another aspect, the invention provides a method for controlling a data rate in a digital audio broadcasting system including: storing data in a buffer, using a codec to code the data read from the buffer, and controlling a bit rate of the codec in response to a level of the data in the buffer.

In another aspect, the invention provides a method for controlling a data rate in a digital audio broadcasting system including: storing data in a buffer, compressing the data, and outputting compressed data at a rate controlled in response to a level of data in the buffer.

BRIEF DESCRIPTION OF THE DRAWINGS

FIG. 5 is a schematic representation of a hybrid AM IBOC DAB waveform.

FIG. 6 is a schematic representation of an all-digital AM IBOC DAB waveform.

DETAILED DESCRIPTION OF THE INVENTION

Figure 11:
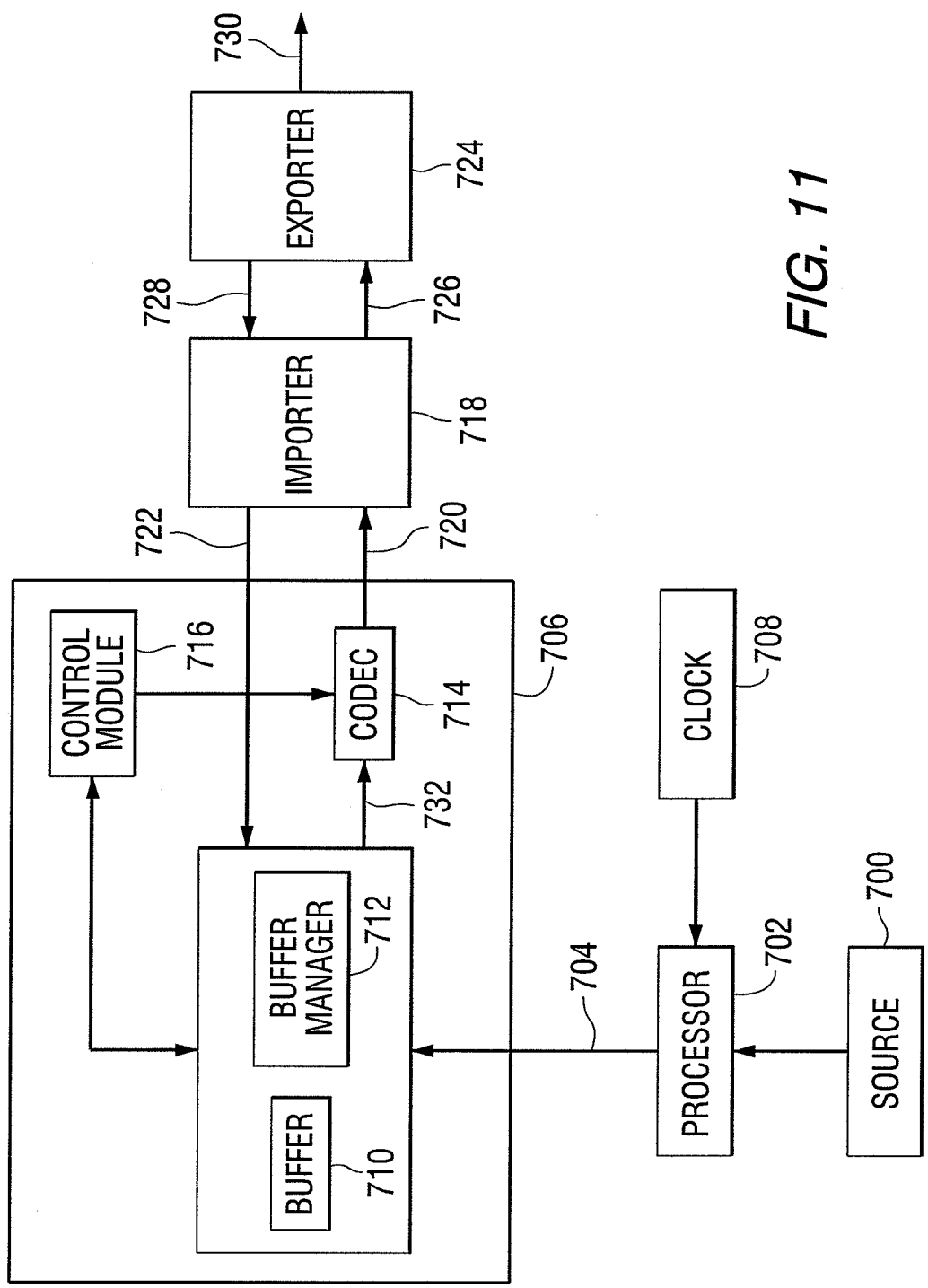
FIG. 11 is a block diagram that illustrates buffering in accordance with an aspect of the invention.
Figure 12:
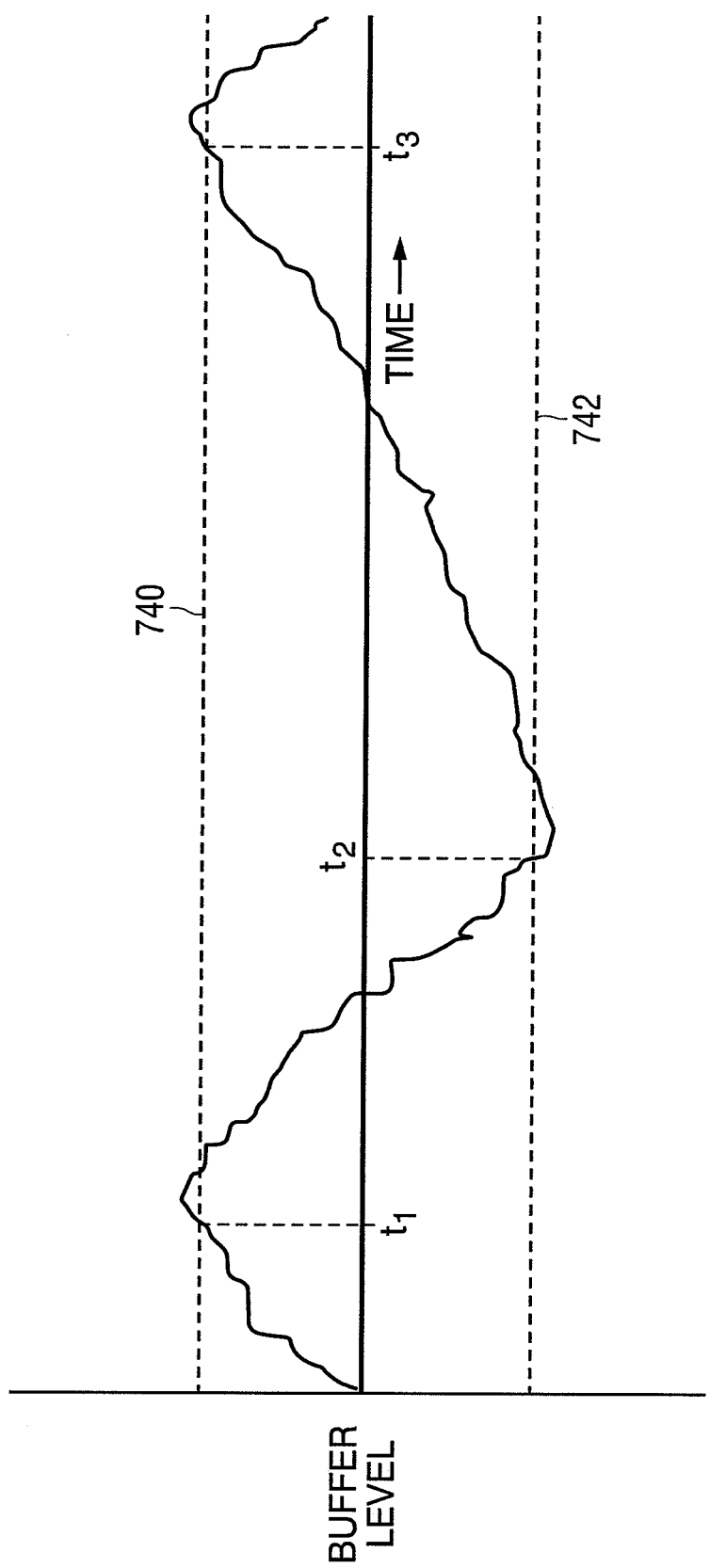
FIG. 12 is a pictorial representation of a buffer level.
Figure 13:
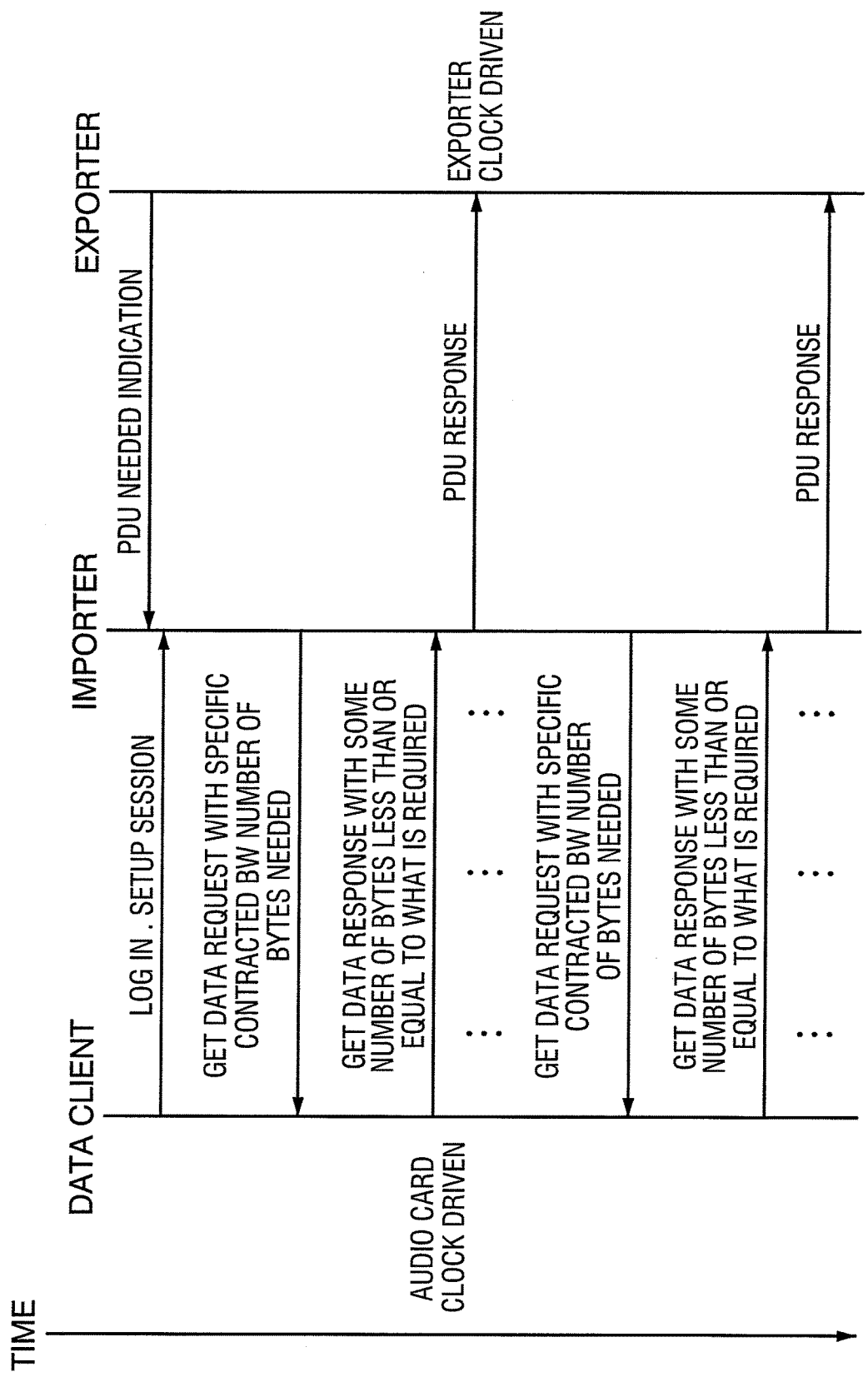
FIG. 13 is a schematic representation of interactions between a data client, an importer, and an exporter.

FIGS. 1-10 and the accompanying description herein provide a general description of an IBOC system, including broadcasting equipment structure and operation, receiver structure and operation, and the structure of IBOC DAB waveforms. FIGS. 11-13 and the accompanying description herein provide a description of aspects of the present invention.

IBOC System and Waveforms

Figure 1:
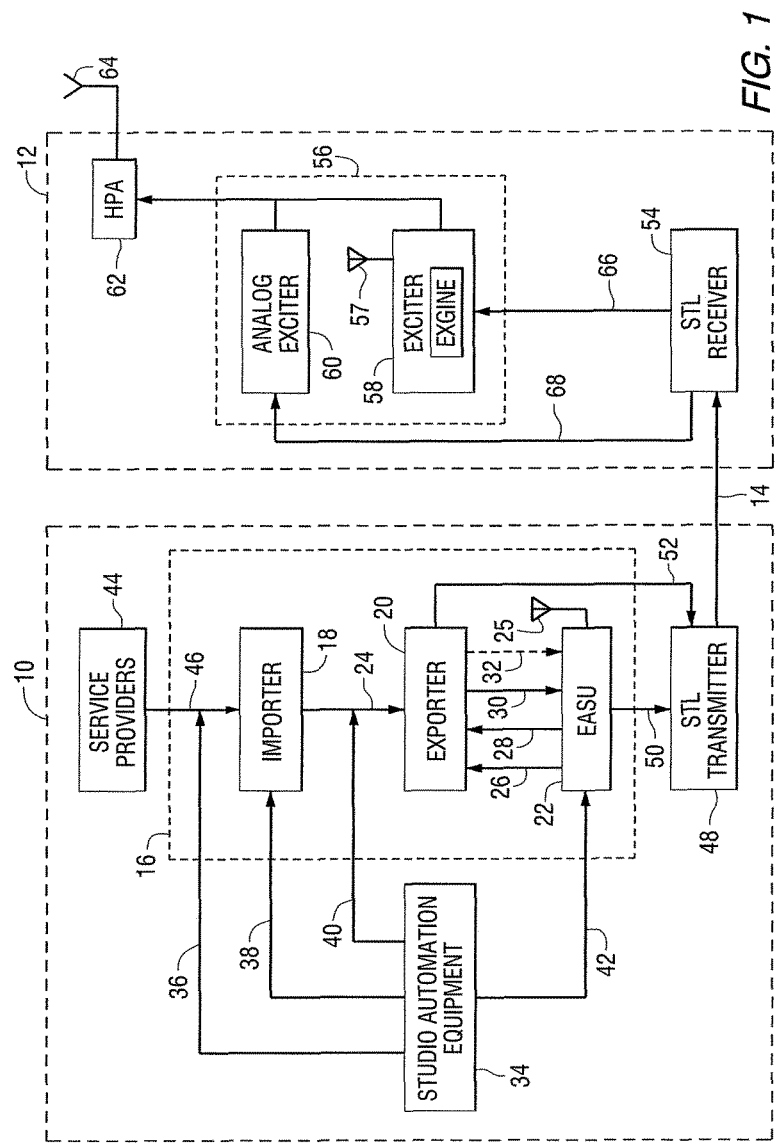
FIG. 1 is a block diagram of a transmitter for use in an in-band on-channel digital radio broadcasting system.

Referring to the drawings, FIG. 1 is a functional block diagram of the relevant components of a studio site 10, an FM transmitter site 12, and a studio transmitter link (STL) 14 that can be used to broadcast an FM IBOC DAB signal. The studio site includes, among other things, studio automation equipment 34, an Ensemble Operations Center (EOC) 16 that includes an importer 18, an exporter 20, an exciter auxiliary service unit (EASU) 22, and an STL transmitter 48. The transmitter site includes an STL receiver 54, a digital exciter 56 that includes an exciter engine (exgine) subsystem 58, and an analog exciter 60. While in FIG. 1 the exporter is resident at a radio station's studio site and the exciter is located at the transmission site, these elements may be co-located at the transmission site.

At the studio site, the studio automation equipment supplies main program service (MPS) audio 42 to the EASU, MPS data 40 to the exporter, supplemental program service (SPS) audio 38 to the importer, and SPS data 36 to the importer. MPS audio serves as the main audio programming source. In hybrid modes, it preserves the existing analog radio programming formats in both the analog and digital transmissions. MPS data, also known as program service data (PSD), includes information such as music title, artist, album name, etc. Supplemental program service can include supplementary audio content as well as program associated data.

The importer contains hardware and software for supplying advanced application services (AAS). A "service" is content that is delivered to users via an IBOC DAB broadcast, and AAS can include any type of data that is not classified as MPS, SPS, or Station Information Service (SIS). SIS provides station information, such as call sign, absolute time, position correlated to GPS, etc. Examples of AAS data include real-time traffic and weather information, navigation map updates or other images, electronic program guides, multimedia programming, other audio services, and other content. The content for AAS can be supplied by service providers 44, which provide service data 46 to the importer via an application program interface (API). The service providers may be a broadcaster located at the studio site or externally sourced third-party providers of services and content. The importer can establish session connections between multiple service providers. The importer encodes and multiplexes service data 46, SPS audio 38, and SPS data 36 to produce exporter link data 24, which is output to the exporter via a data link.

The exporter 20 contains the hardware and software necessary to supply the main program service and SIS for broadcasting. The exporter accepts digital MPS audio 26 over an audio interface and compresses the audio. The exporter also multiplexes MPS data 40, exporter link data 24, and the compressed digital MPS audio to produce exciter link data 52. In addition, the exporter accepts analog MPS audio 28 over its audio interface and applies a pre-programmed delay to it to produce a delayed analog MPS audio signal 30. This analog audio can be broadcast as a backup channel for hybrid IBOC DAB broadcasts. The delay compensates for the system delay of the digital MPS audio, allowing receivers to blend between the digital and analog program without a shift in time. In an AM transmission system, the delayed MPS audio signal 30 is converted by the exporter to a mono signal and sent directly to the STL as part of the exciter link data 52.

The EASU 22 accepts MPS audio 42 from the studio automation equipment, rate converts it to the proper system clock, and outputs two copies of the signal, one digital (26) and one analog (28). The EASU includes a GPS receiver that is connected to an antenna 25. The GPS receiver allows the EASU to derive a master clock signal, which is synchronized to the exciter's clock by use of GPS units. The EASU provides the master system clock used by the exporter. The EASU is also used to bypass (or redirect) the analog MPS audio from being passed through the exporter in the event the exporter has a catastrophic fault and is no longer operational. The bypassed audio 32 can be fed directly into the STL transmitter, eliminating a dead-air event.

STL transmitter 48 receives delayed analog MPS audio 50 and exciter link data 52. It outputs exciter link data and delayed analog MPS audio over STL link 14, which may be either unidirectional or bidirectional. The STL link may be a digital microwave or Ethernet link, for example, and may use the standard User Datagram Protocol or the standard TCP/IP.

The transmitter site includes an STL receiver 54, an exciter 56 and an analog exciter 60. The STL receiver 54 receives exciter link data, including audio and data signals as well as command and control messages, over the STL link 14. The exciter link data is passed to the exciter 56, which produces the IBOC DAB waveform. The exciter includes a host processor, digital up-converter, RF up-converter, and exgine subsystem 58. The exgine accepts exciter link data and modulates the digital portion of the IBOC DAB waveform. The digital up-converter of exciter 56 converts from digital-to-analog the baseband portion of the exgine output. The digital-to-analog conversion is based on a GPS clock, common to that of the exporter's GPS-based clock derived from the EASU. Thus, the exciter 56 includes a GPS unit and antenna 57. An alternative method for synchronizing the exporter and exciter clocks can be found in U.S. patent application Ser. No. 11/081,267 (Publication No. 2006/0209941 A1), the disclosure of which is hereby incorporated by reference. The RF up-converter of the exciter up-converts the analog signal to the proper in-band channel frequency. The up-converted signal is then passed to the high power amplifier 62 and antenna 64 for broadcast. In an AM transmission system, the exgine subsystem coherently adds the backup analog MPS audio to the digital waveform in the hybrid mode; thus, the AM transmission system does not include the analog exciter 60. In addition, the exciter 56 produces phase and magnitude information and the analog signal is output directly to the high power amplifier.

IBOC DAB signals can be transmitted in both AM and FM radio bands, using a variety of waveforms. The waveforms include an FM hybrid IBOC DAB waveform, an FM all-digital IBOC DAB waveform, an AM hybrid IBOC DAB waveform, and an AM all-digital IBOC DAB waveform.

Figure 2:
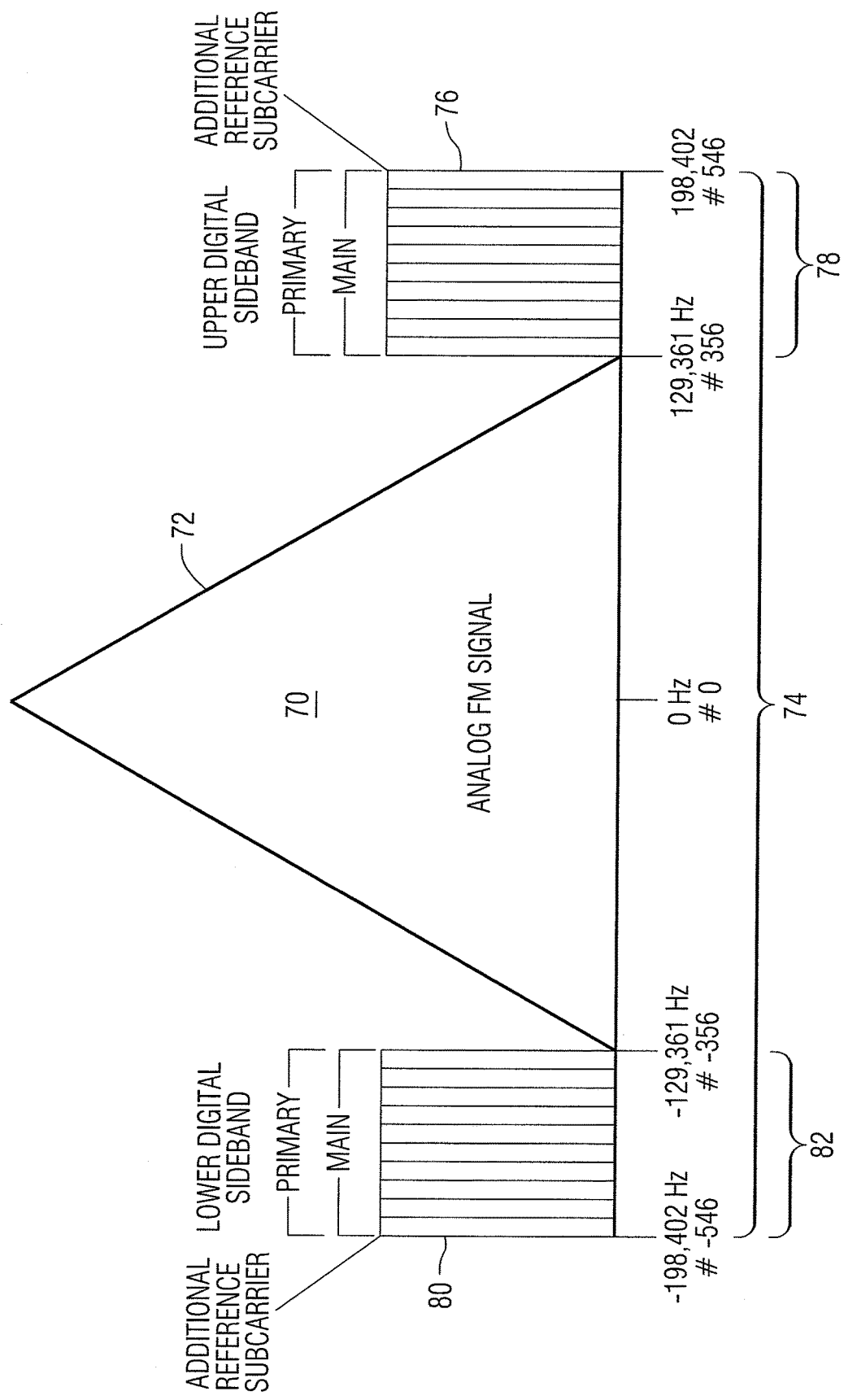
FIG. 2 is a schematic representation of a hybrid FM IBOC waveform.

FIG. 2 is a schematic representation of a hybrid FM IBOC waveform 70. The waveform includes an analog modulated signal 72 located in the center of a broadcast channel 74, a first plurality of evenly spaced orthogonally frequency division multiplexed subcarriers 76 in an upper sideband 78, and a second plurality of evenly spaced orthogonally frequency division multiplexed subcarriers 80 in a lower sideband 82. The digitally modulated subcarriers are divided into partitions and various subcarriers are designated as reference subcarriers. A frequency partition is a group of 19 OFDM subcarriers containing 18 data subcarriers and one reference subcarrier.

The hybrid waveform includes an analog FM-modulated signal, plus digitally modulated primary main subcarriers. The subcarriers are located at evenly spaced frequency locations. The subcarrier locations are numbered from −546 to +546. In the waveform of FIG. 2, the subcarriers are at locations +356 to +546 and −356 to −546. Each primary main sideband is comprised of ten frequency partitions. Subcarriers 546 and −546, also included in the primary main sidebands, are additional reference subcarriers. The amplitude of each subcarrier can be scaled by an amplitude scale factor.

Figure 3:
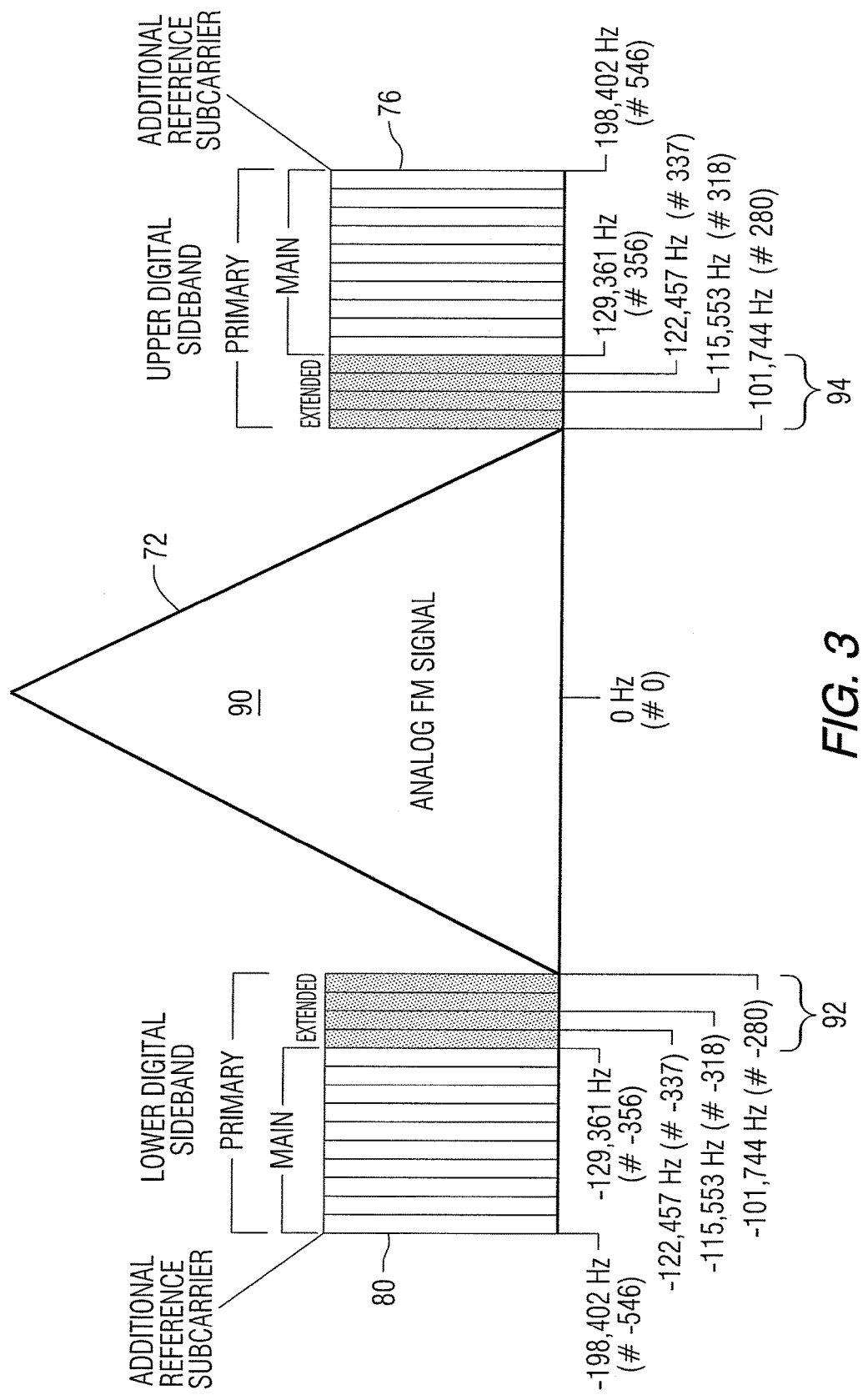
FIG. 3 is a schematic representation of an extended hybrid FM IBOC waveform.

FIG. 3 is a schematic representation of an extended hybrid FM IBOC waveform 90. The extended hybrid waveform is created by adding primary extended sidebands 92, 94 to the primary main sidebands present in the hybrid waveform. One, two, or four frequency partitions can be added to the inner edge of each primary main sideband. The extended hybrid waveform includes the analog FM signal plus digitally modulated primary main subcarriers (subcarriers +356 to +546 and −356 to −546) and some or all primary extended subcarriers (subcarriers +280 to +355 and −280 to −355).

The upper primary extended sidebands include subcarriers 337 through 355 (one frequency partition), 318 through 355 (two frequency partitions), or 280 through 355 (four frequency partitions). The lower primary extended sidebands include subcarriers −337 through −355 (one frequency partition), −318 through −355 (two frequency partitions), or −280 through −355 (four frequency partitions). The amplitude of each subcarrier can be scaled by an amplitude scale factor.

Figure 4:
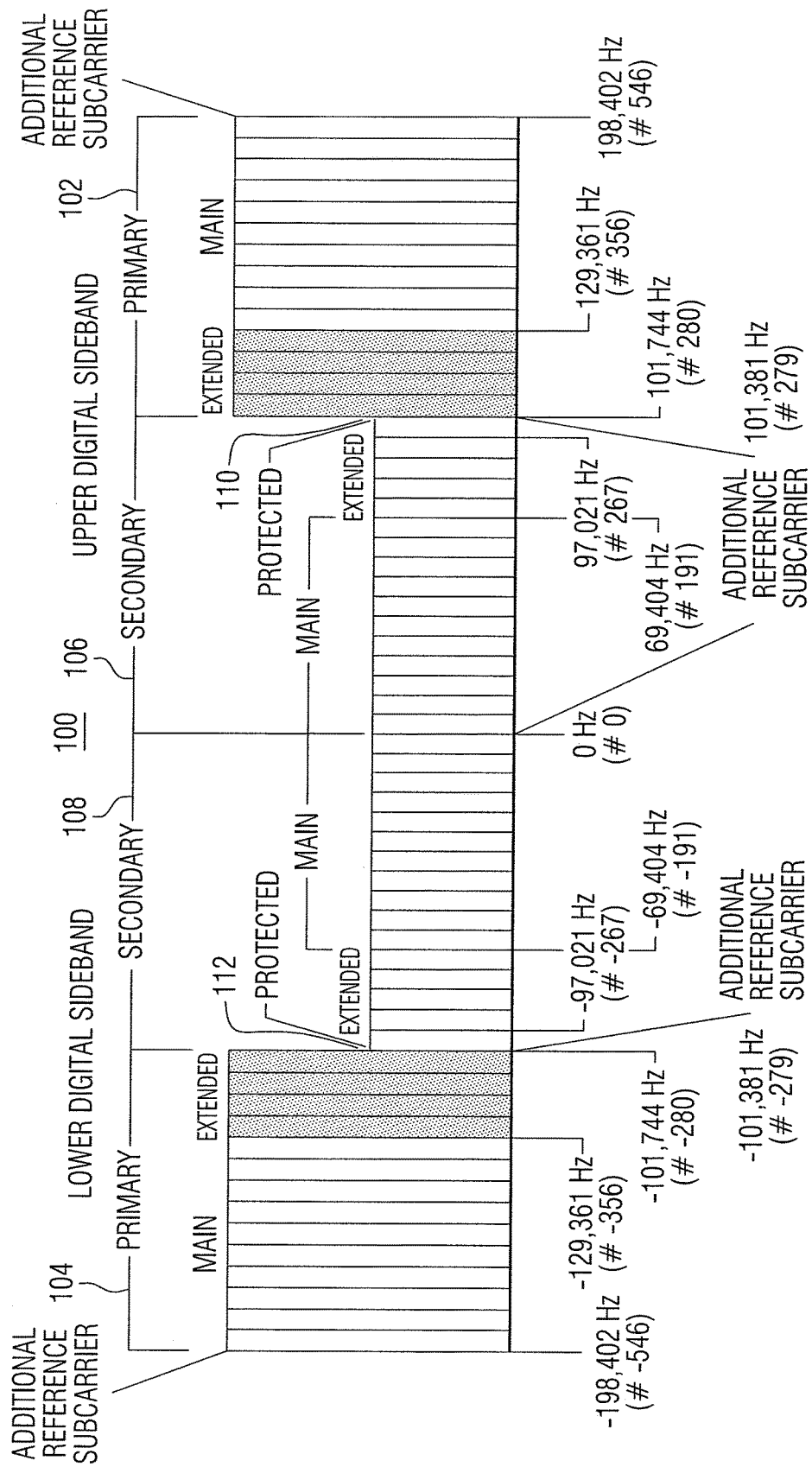
FIG. 4 is a schematic representation of an all-digital FM IBOC waveform.

FIG. 4 is a schematic representation of an all-digital FM IBOC waveform 100. The all-digital waveform is constructed by disabling the analog signal, fully expanding the bandwidth of the primary digital sidebands 102, 104, and adding lower-power secondary sidebands 106, 108 in the spectrum vacated by the analog signal. The all-digital waveform in the illustrated embodiment includes digitally modulated subcarriers at subcarrier locations −546 to +546, without an analog FM signal.

In addition to the ten main frequency partitions, all four extended frequency partitions are present in each primary sideband of the all-digital waveform. Each secondary sideband also has ten secondary main (SM) and four secondary extended (SX) frequency partitions. Unlike the primary sidebands, however, the secondary main frequency partitions are mapped nearer to the channel center with the extended frequency partitions farther from the center.

Each secondary sideband also supports a small secondary protected (SP) region 110, 112 including 12 OFDM subcarriers and reference subcarriers 279 and −279. The sidebands are referred to as "protected" because they are located in the area of spectrum least likely to be affected by analog or digital interference. An additional reference subcarrier is placed at the center of the channel (0). Frequency partition ordering of the SP region does not apply since the SP region does not contain frequency partitions.

Each secondary main sideband spans subcarriers 1 through 190 or −1 through −190. The upper secondary extended sideband includes subcarriers 191 through 266, and the upper secondary protected sideband includes subcarriers 267 through 278, plus additional reference subcarrier 279. The lower secondary extended sideband includes subcarriers −191 through −266, and the lower secondary protected sideband includes subcarriers −267 through −278, plus additional reference subcarrier −279. The total frequency span of the entire all-digital spectrum is 396,803 Hz. The amplitude of each subcarrier can be scaled by an amplitude scale factor. The secondary sideband amplitude scale factors can be user selectable. Any one of the four may be selected for application to the secondary sidebands.

In each of the waveforms, the digital signal is modulated using orthogonal frequency division multiplexing (OFDM). OFDM is a parallel modulation scheme in which the data stream modulates a large number of orthogonal subcarriers, which are transmitted simultaneously. OFDM is inherently flexible, readily allowing the mapping of logical channels to different groups of subcarriers.

In the hybrid waveform, the digital signal is transmitted in primary main (PM) sidebands on either side of the analog FM signal in the hybrid waveform. The power level of each sideband is appreciably below the total power in the analog FM signal. The analog signal may be monophonic or stereo, and may include subsidiary communications authorization (SCA) channels.

In the extended hybrid waveform, the bandwidth of the hybrid sidebands can be extended toward the analog FM signal to increase digital capacity. This additional spectrum, allocated to the inner edge of each primary main sideband, is termed the primary extended (PX) sideband.

In the all-digital waveform, the analog signal is removed and the bandwidth of the primary digital sidebands is fully extended as in the extended hybrid waveform. In addition, this waveform allows lower-power digital secondary sidebands to be transmitted in the spectrum vacated by the analog FM signal.

FIG. 5 is a schematic representation of an AM hybrid IBOC DAB waveform 120. The hybrid format includes the conventional AM analog signal 122 (bandlimited to about ±5 kHz) along with a nearly 30 kHz wide DAB signal 124. The spectrum is contained within a channel 126 having a bandwidth of about 30 kHz. The channel is divided into upper 130 and lower 132 frequency bands. The upper band extends from the center frequency of the channel to about +15 kHz from the center frequency. The lower band extends from the center frequency to about −15 kHz from the center frequency.

The AM hybrid IBOC DAB signal format in one example comprises the analog modulated carrier signal 134 plus OFDM subcarrier locations spanning the upper and lower bands. Coded digital information representative of the audio or data signals to be transmitted (program material), is transmitted on the subcarriers. The symbol rate is less than the subcarrier spacing due to a guard time between symbols.

As shown in FIG. 5, the upper band is divided into a primary section 136, a secondary section 138, and a tertiary section 144. The lower band is divided into a primary section 140, a secondary section 142, and a tertiary section 143. For the purpose of this explanation, the tertiary sections 143 and 144 can be considered to include a plurality of groups of subcarriers labeled 146, 148, 150 and 152 in FIG. 5. Subcarriers within the tertiary sections that are positioned near the center of the channel are referred to as inner subcarriers, and subcarriers within the tertiary sections that are positioned farther from the center of the channel are referred to as outer subcarriers. In this example, the power level of the inner subcarriers in groups 148 and 150 is shown to decrease linearly with frequency spacing from the center frequency. The remaining groups of subcarriers 146 and 152 in the tertiary sections have substantially constant power levels. FIG. 5 also shows two reference subcarriers 154 and 156 for system control, whose levels are fixed at a value that is different from the other sidebands.

The power of subcarriers in the digital sidebands is significantly below the total power in the analog AM signal. The level of each OFDM subcarrier within a given primary or secondary section is fixed at a constant value. Primary or secondary sections may be scaled relative to each other. In addition, status and control information is transmitted on reference subcarriers located on either side of the main carrier. A separate logical channel, such as an IBOC Data Service (IDS) channel can be transmitted in individual subcarriers just above and below the frequency edges of the upper and lower secondary sidebands. The power level of each primary OFDM subcarrier is fixed relative to the unmodulated main analog carrier. However, the power level of the secondary subcarriers, logical channel subcarriers, and tertiary subcarriers is adjustable.

Using the modulation format of FIG. 5, the analog modulated carrier and the digitally modulated subcarriers are transmitted within the channel mask specified for standard AM broadcasting in the United States. The hybrid system uses the analog AM signal for tuning and backup.

FIG. 6 is a schematic representation of the subcarrier assignments for an all-digital AM IBOC DAB waveform. The all-digital AM IBOC DAB signal 160 includes first and second groups 162 and 164 of evenly spaced subcarriers, referred to as the primary subcarriers, that are positioned in upper and lower bands 166 and 168. Third and fourth groups 170 and 172 of subcarriers, referred to as secondary and tertiary subcarriers respectively, are also positioned in upper and lower bands 166 and 168. Two reference subcarriers 174 and 176 of the third group lie closest to the center of the channel. Subcarriers 178 and 180 can be used to transmit program information data.

Figure 7:
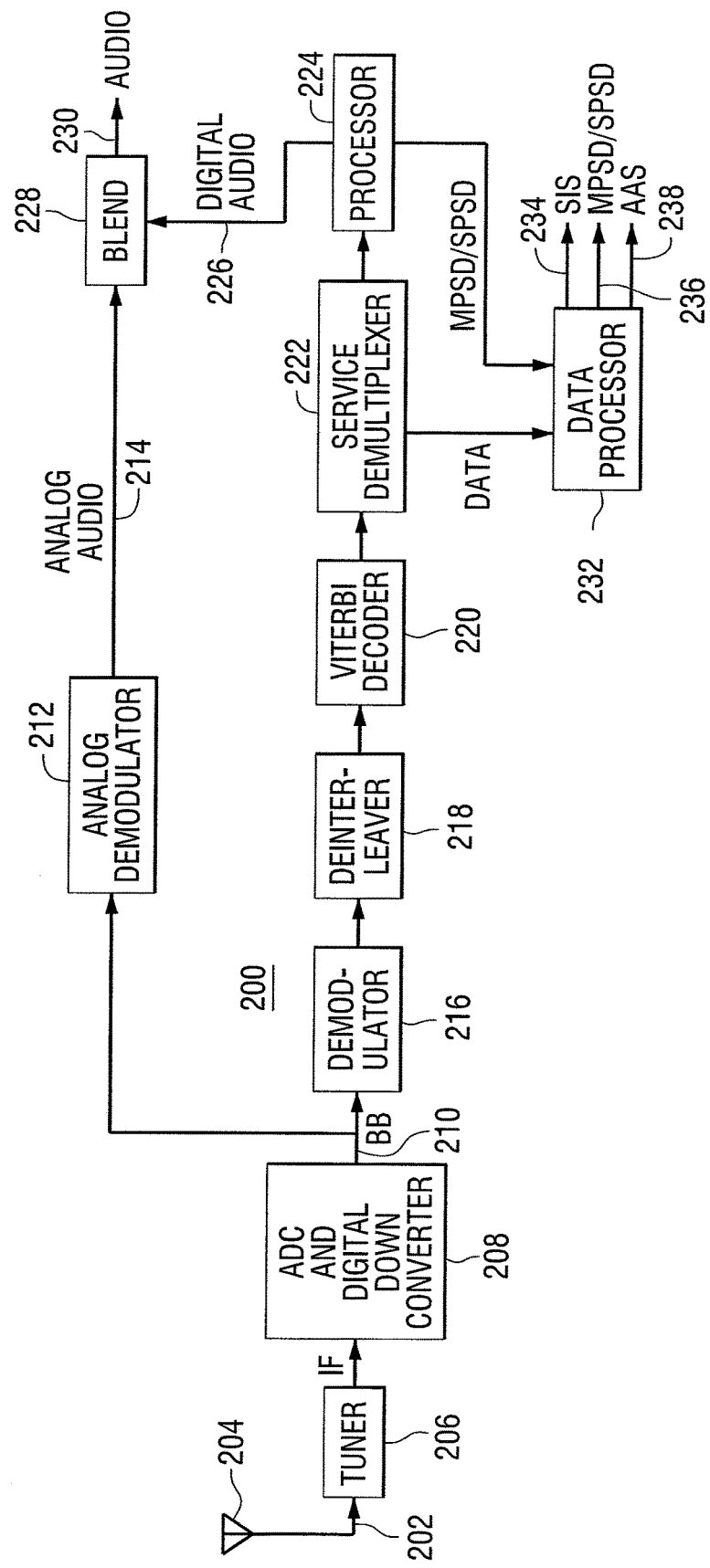
FIG. 7 is a functional block diagram of an AM IBOC DAB receiver.

FIG. 7 is a simplified functional block diagram of an AM IBOC DAB receiver 200. The receiver includes an input 202 connected to an antenna 204, a tuner or front end 206, and a digital down converter 208 for producing a baseband signal on line 210. An analog demodulator 212 demodulates the analog modulated portion of the baseband signal to produce an analog audio signal on line 214. A digital demodulator 216 demodulates the digitally modulated portion of the baseband signal. Then the digital signal is deinterleaved by a deinterleaver 218, and decoded by a Viterbi decoder 220. A service demultiplexer 222 separates main and supplemental program signals from data signals. A processor 224 processes the program signals to produce a digital audio signal on line 226. The analog and main digital audio signals are blended as shown in block 228, or a supplemental digital audio signal is passed through, to produce an audio output on line 230. A data processor 232 processes the data signals and produces data output signals on lines 234, 236 and 238. The data signals can include, for example, a station information service (SIS), main program service data (MPSD), supplemental program service data (SPSD), and one or more auxiliary application services (AAS).

Figure 8:
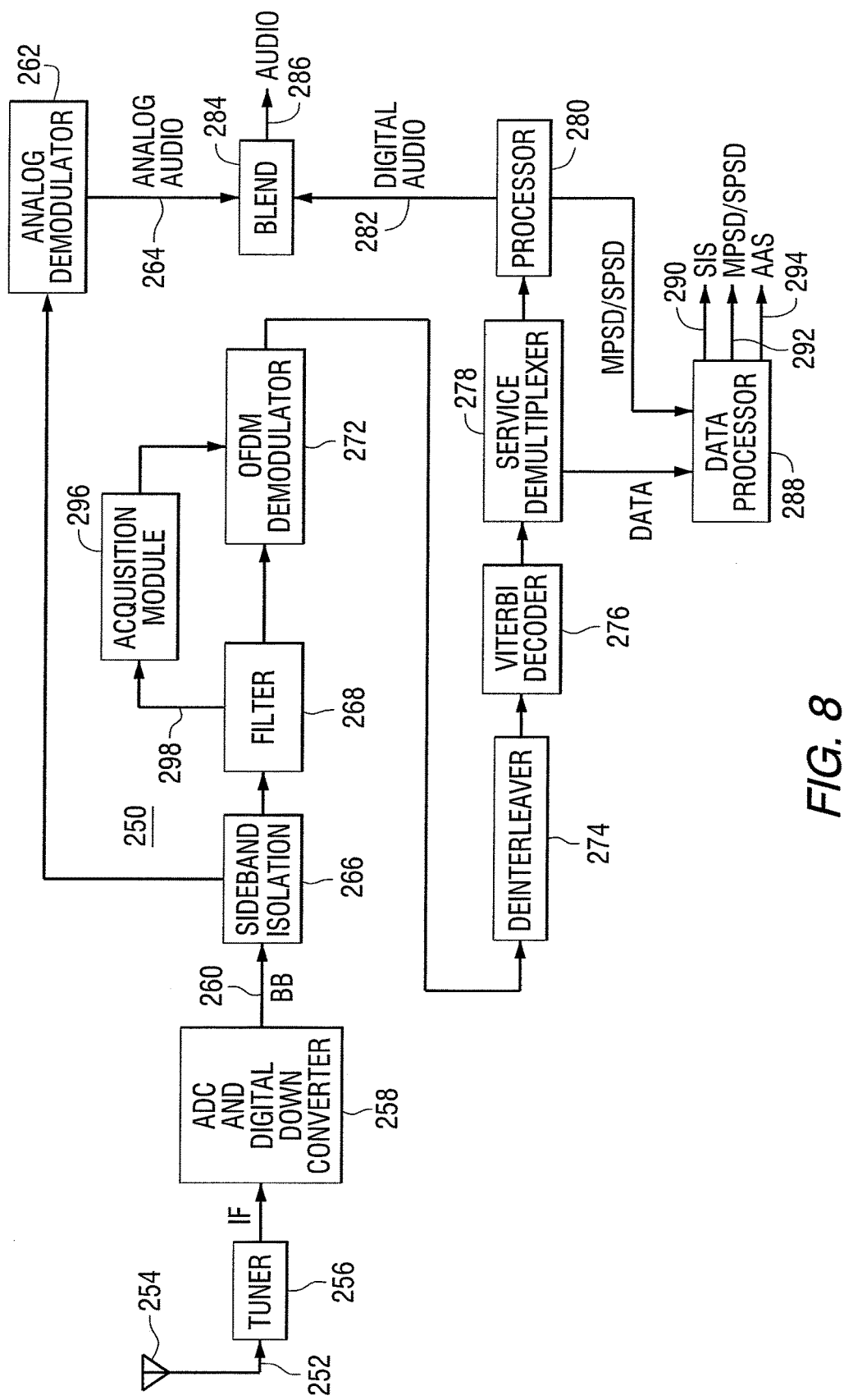
FIG. 8 is a functional block diagram of an FM IBOC DAB receiver.

FIG. 8 is a simplified functional block diagram of an FM IBOC DAB receiver 250. The receiver includes an input 252 connected to an antenna 254 and a tuner or front end 256. A received signal is provided to an analog-to-digital converter and digital down converter 258 to produce a baseband signal at output 260 comprising a series of complex signal samples. The signal samples are complex in that each sample comprises a "real" component and an "imaginary" component, which is sampled in quadrature to the real component. An analog demodulator 262 demodulates the analog modulated portion of the baseband signal to produce an analog audio signal on line 264. The digitally modulated portion of the sampled baseband signal is next filtered by sideband isolation filter 266, which has a pass-band frequency response comprising the collective set of subcarriers $f_1$-$f_n$ present in the received OFDM signal. Filter 268 suppresses the effects of a first-adjacent interferer. Complex signal 298 is routed to the input of acquisition module 296, which acquires or recovers OFDM symbol timing offset or error and carrier frequency offset or error from the received OFDM symbols as represented in received complex signal 298. Acquisition module 296 develops a symbol timing offset $\Delta t$ and carrier frequency offset $\Delta f$, as well as status and control information. The signal is then demodulated (block 272) to demodulate the digitally modulated portion of the baseband signal. Then the digital signal is deinterleaved by a deinterleaver 274, and decoded by a Viterbi decoder 276. A service demultiplexer 278 separates main and supplemental program signals from data signals. A processor 280 processes the main and supplemental program signals to produce a digital audio signal on line 282. The analog and main digital audio signals are blended as shown in block 284, or the supplemental program signal is passed through, to produce an audio output on line 286. A data processor 288 processes the data signals and produces data output signals on lines 290, 292 and 294. The data signals can include, for example, a station information service (SIS), main program service data (NPSD), supplemental program service data (SPSD), and one or more advanced application services (AAS).

In practice, many of the signal processing functions shown in the receivers of FIGS. 7 and 8 can be implemented using one or more integrated circuits.

Figure 9A:
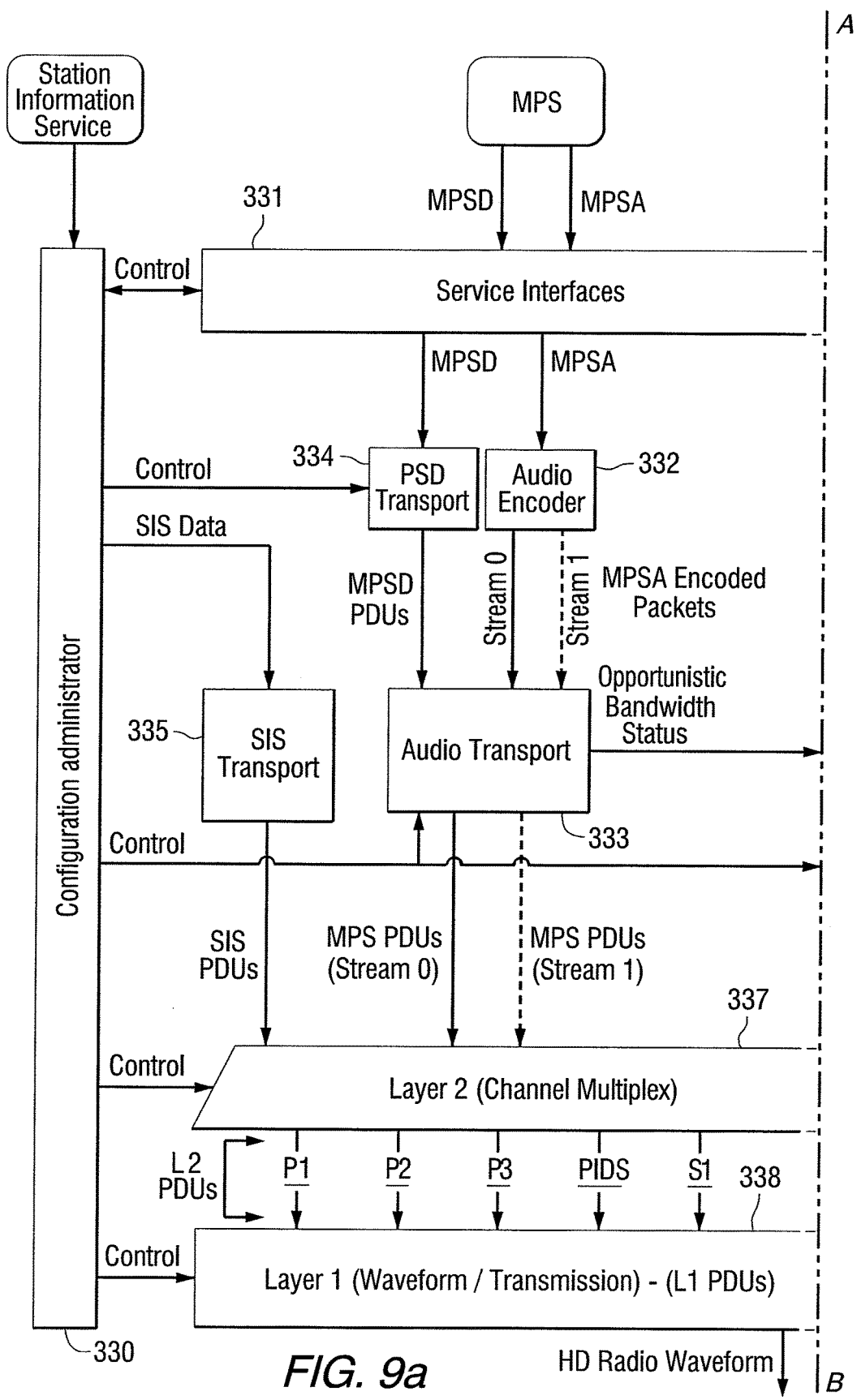
FIGS. 9a and 9b are diagrams of an IBOC DAB logical protocol stack from the broadcast perspective.
Figure 9B:
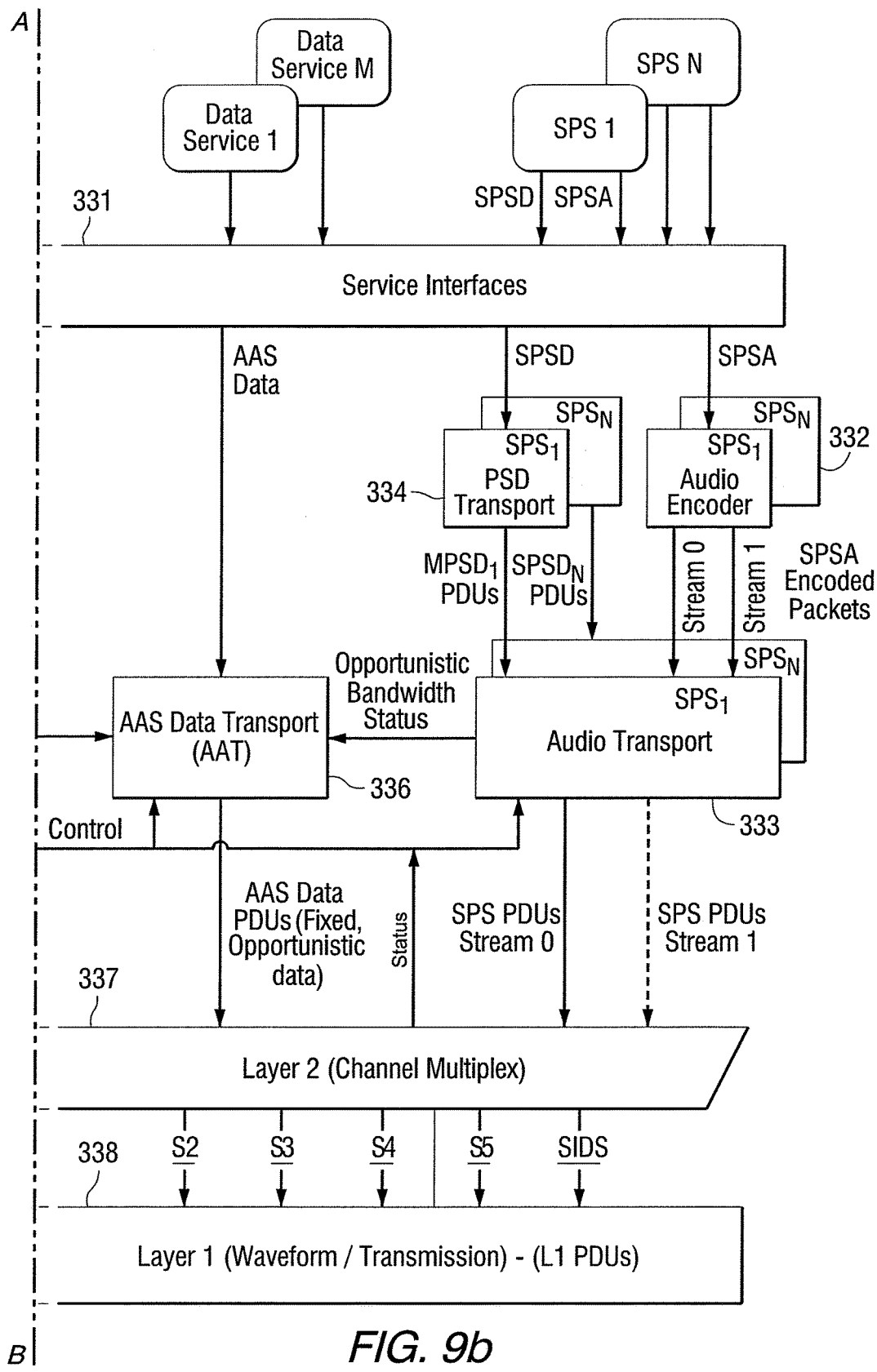

FIGS. 9*a* and 9*b* are diagrams of an IBOC DAB logical protocol stack from the transmitter perspective. From the receiver perspective, the logical stack will be traversed in the opposite direction. Most of the data being passed between the various entities within the protocol stack are in the form of protocol data units (PDUs). A PDU is a structured data block that is produced by a specific layer (or process within a layer) of the protocol stack. The PDUs of a given layer may encapsulate PDUs from the next higher layer of the stack and/or include content data and protocol control information originating in the layer (or process) itself. The PDUs generated by each layer (or process) in the transmitter protocol stack are inputs to a corresponding layer (or process) in the receiver protocol stack.

As shown in FIGS. 9*a* and 9*b*, there is a configuration administrator 330, which is a system function that supplies configuration and control information to the various entities within the protocol stack. The configuration/control information can include user defined settings, as well as information generated from within the system such as GPS time and position. The service interfaces 331 represent the interfaces for all services except SIS. The service interface may be different for each of the various types of services. For example, for MPS audio and SPS audio, the service interface may be an audio card. For MPS data and SPS data the interfaces may be in the form of different application program interfaces (APIs). For all other data services the interface is in the form of a single API. An audio codec 332 encodes both MPS audio and SPS audio to produce core (Stream 0) and optional enhancement (Stream 1) streams of MPS and SPS audio encoded packets, which are passed to audio transport 333. Audio codec 332 also relays unused capacity status to other parts of the system, thus allowing the inclusion of opportunistic data. MPS and SPS data is processed by program service data (PSD) transport 334 to produce MPS and SPS data PDUs, which are passed to audio transport 333. Audio transport 333 receives encoded audio packets and PSD PDUs and outputs bit streams containing both compressed audio and program service data. The SIS transport 335 receives SIS data from the configuration administrator and generates SIS PDUs. A SIS PDU can contain station identification and location information, program type, as well as absolute time and position correlated to GPS. The AAS data transport 336 receives AAS data from the service interface, as well as opportunistic bandwidth data from the audio transport, and generates AAS data PDUs, which can be based on quality of service parameters. The transport and encoding functions are collectively referred to as Layer 4 of the protocol stack and the corresponding transport PDUs are referred to as Layer 4 PDUs or L4 PDUs. Layer 2, which is the channel multiplex layer, (337) receives transport PDUs from the SIS transport, AAS data transport, and audio transport, and formats them into Layer 2 PDUs. A Layer 2 PDU includes protocol control information and a payload, which can be audio, data, or a combination of audio and data. Layer 2 PDUs are routed through the correct logical channels to Layer 1 (338), wherein a logical channel is a signal path that conducts L1 PDUs through Layer 1 with a specified grade of service. There are multiple Layer 1 logical channels based on service mode, wherein a service mode is a specific configuration of operating parameters specifying throughput, performance level, and selected logical channels. The number of active Layer 1 logical channels and the characteristics defining them vary for each service mode. Status information is also passed between Layer 2 and Layer 1. Layer 1 converts the PDUs from Layer 2 and system control information into an AM or FM IBOC DAB waveform for transmission. Layer 1 processing can include scrambling, channel encoding, interleaving, OFDM subcarrier mapping, and OFDM signal generation. The output of OFDM signal generation is a complex, baseband, time domain pulse representing the digital portion of an IBOC signal for a particular symbol. Discrete symbols are concatenated to form a continuous time domain waveform, which is modulated to create an IBOC waveform for transmission.

Figure 10:
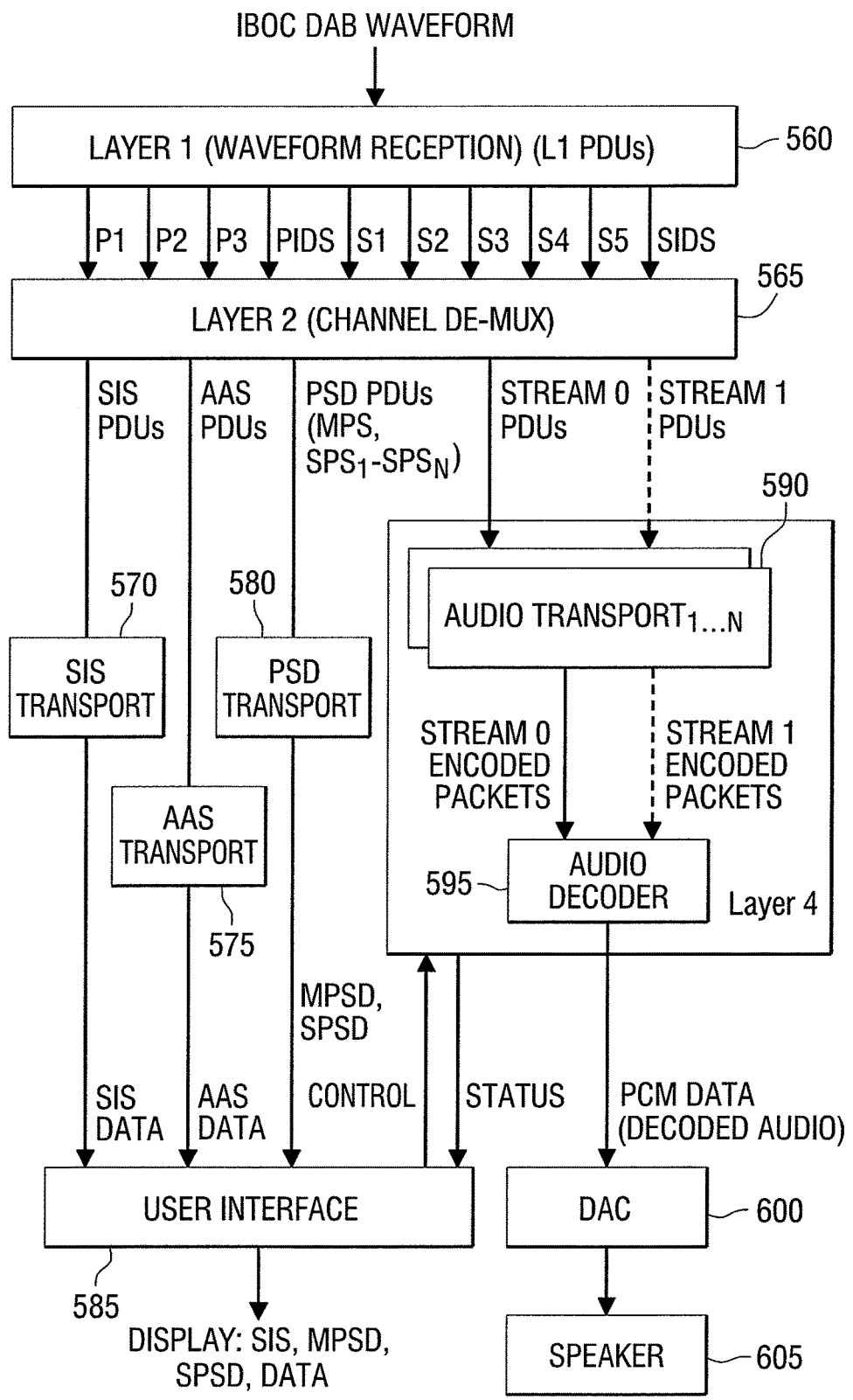
FIG. 10 is a diagram of an IBOC DAB logical protocol stack from the receiver perspective.

FIG. 10 shows the logical protocol stack from the receiver perspective. An IBOC waveform is received by the physical layer, Layer 1 (560), which demodulates the signal and processes it to separate the signal into logical channels. The number and kind of logical channels will depend on the service mode, and may include logical channels P1-P3, PIDS, S1-S5, and SIDS. Layer 1 produces L1 PDUs corresponding to the logical channels and sends the PDUs to Layer 2 (565), which demultiplexes the L1 PDUs to produce SIS PDUs, AAS PDUs, PSD PDUs for the main program service and any supplemental program services, and Stream 0 (core) audio PDUs and Stream 1 (optional enhanced) audio PDUs. The SIS PDUs are then processed by the SIS transport 570 to produce SIS data, the AAS PDUs are processed by the AAS transport 575 to produce AAS data, and the PSD PDUs are processed by the PSD transport 580 to produce MPS data (MPSD) and any SPS data (SPSD). The SIS data, AAS data, MPSD and SPSD are then sent to a user interface 590. The SIS data, if requested by a user, can then be displayed. Likewise, MPSD, SPSD, and any text based or graphical AAS data can be displayed. The Stream 0 and Stream 1 PDUs are processed by Layer 4, comprised of audio transport 590 and audio decoder 595. There may be up to N audio transports corresponding to the number of programs received on the IBOC waveform. Each audio transport produces encoded MPS packets or SPS packets, corresponding to each of the received programs. Layer 4 receives control information from the user interface, including commands such as to store or play programs, and to seek or scan for radio stations broadcasting an all-digital or hybrid IBOC signal. Layer 4 also provides status information to the user interface.

Streaming

The HD Radio system uses an importer to collect all advanced data services and secondary program services into a package that is delivered to the exporter/exciter. As shown in and described with respect to FIG. 1, the main program service audio is multiplexed in at the exporter. These services are then put on various logical channels which map to sets of OFDM carriers. Clients, who may be service providers, for example, connect to the importer and then follow a request/respond mechanism initiated by the importer. It is at this point where the secondary audio or data services may be clocked at a different fundamental rate than the asking side, i.e., the importer.

The HD Radio system services two types of data, streaming (e.g., audio, video) and all other kinds of data. In this regard, data in the form of an audio stream does not refer to the main or supplemental program services, but rather to other audio that may be sent via the data transport of the HD Radio broadcast system, called the Radio Link Service (RLS). Unlike other types of data, a stream has time requirements for delivery. If these time requirements are not met, there will most likely be gaps in the user's reception of the service where there is no data (possibly audio) to play. RLS previously has not been used to stream data (audio or other) because there is a non-deterministic bandwidth allocation algorithm at its core, which uses a partial High-Level Data Link Control (HDLC) framing technique. This HDLC framing may insert escape characters into the data stream, which is dependent on the data content, thus not easily lending itself to determinism.

In one aspect, the invention attempts to treat the non-deterministic behavior of the bandwidth allocation algorithm of RLS as a clock mismatch issue. If the generating clock (transmit side) differs in frequency enough from the reconstruction clock (receiving side), a possible data overflow or underflow would occur at the receiver. This situation can be addressed on the transmit side according to an aspect of the present invention by tying a buffer management policy to the codec rate, thus allowing the buffer level to drive a slow control loop that will in turn drive the codec rate. This will have the effect of mitigating any non-deterministic behavior in the partial HDLC framing technique employed by the RLS. This requires that the codec be bit rate controllable and phase continuous at the switches. Changes in frequency are phase continuous when they do not cause discontinuities in the phase (or amplitude) of the output signal.

FIG. 11 is a block diagram of a Client/Importer/Exporter Connection, showing the flow of data requests and responses between the Importer and Exporter. In this example, a data source 700 supplies data (e.g. audio, video, or other data) to a processor 702, which can be, for example an audio card, video card, or other processor to produce a data signal on line 704 that is supplied to a data client 706. The timing of the processor is controlled by a clock 708. The data client includes a buffer 710, a buffer management module 712, a codec 714, and control module 716. The data client sends data to the importer 718 on line 720 and receives data requests on line 722. The importer in turn determines which clients need to supply data based on a service-to-logical channel mapping. A plurality of clients can be connected to the importer. The exporter 724 receives data in the form of protocol data units on line 726, and sends a PDU indication signal to the importer on line 728. The exporter requests data at the exciter clock rate, and drives the importer output rate and the rate of data requests from the importer to clients. The clients may be clocked at various rates which may or may not be tied to the exciter clock. The exporter uses the PDUs to produce an output signal on line 730.

The data on line 704 can be in the form of pulse code modulated (PCM) audio samples, which are stored in a buffer 710. The buffer management module 712 receives data requests on line 722, retrieves data from the buffer, and sends the retrieved data to the codec 714 on line 732. The control module 716 monitors the level of data stored in the buffer and controls the operation of the codec in response to the level of data in the buffer. The codec outputs compressed data on line 720. The buffer management module 712, buffer 710, and control module 716 can be implemented as software components in the data client. Alternatively, these functions can be implemented as software components in the importer.

The buffer management module 712 would typically use some locking mechanism such as a semaphore to insure that the "state" of the buffer is preserved. The state of the buffer is simply the level or the amount of data in the buffer. The locking semaphore would be taken if an output action is requested and released after the state of the buffer is updated to reflect less data in the buffer. In a similar fashion, the locking semaphore would be taken by the input before a new data packet is committed to the buffer, and released after it is committed and the state is updated. In this way the buffer manager ensures that the asynchronous nature of the inputting to the buffer and the outputting from the buffer preserve a consistent buffer state. The state of the buffer will be important to assess whether or not any external action is required to keep the level or state of the buffer essentially constant.

From the data client side, any deviation from an exact requesting rate will appear to be a clock mismatch, even if it is the result of extra bytes put in the data stream by the RLS transport protocol. Thus, even if the client and exporter/exciter clocks are matched, the non-deterministic behavior of the partial HDLC framing will introduce what will appear to be clock frequency mismatches or phase drifts. In one aspect, the method of buffer management of the present invention will mitigate the clock mismatch issue regardless of how it has been introduced.

The control module 716 may employ a simple slow data control loop to determine if any action is required to increase or decrease the buffer level. The single observable parameter is the buffer level (or state). FIG. 12 is a pictorial illustration of an example buffer level, showing how the level may evolve over time. The dashed lines 740 and 742 represent boundary levels of the buffer. Whenever the buffer level equals or exceeds these levels, either greater than the overflow boundary 740 or less than the underflow boundary 742 levels, an action is taken, for example at time $t_1$, $t_2$ and $t_3$. This action would increase or decrease the compression rate of the codec 710, so that the level would stay in the acceptable range of level in between the dashed lines.

Thus, in one example, the dashed lines 740 and 742 represent first and second predetermined buffer threshold levels, wherein the first threshold level is higher than the second threshold level. If the buffer level exceeds the first threshold level, then the buffer level is considered to be too high. If the buffer level is below the second threshold level, then the buffer level is considered to be too low. If the buffer level is between the two threshold levels, then the buffer level is considered to be acceptable.

If the level is above the first threshold level, a command can be sent by the control module 716 to the codec 714 to reduce the bit-rate; thus the codec will produce less data per block of PCM audio data. If the buffer level is below the second threshold level, the control module can either simply hold off the data requests from the importer, thus forfeiting some of the bandwidth it has been allocated, or it can increase the bit-rate of the codec so the codec produces more data per block of data samples.

The bit rate control would depend on what is available from the codec being used. In order to use this type of control system, the codec would have to be phase continuous at the bit rate changes; otherwise there may be artifacts or discontinuities in the output waveform. However, if the codec could switch bit rate phase continuously, then when an action is deemed necessary by the control module a switch to the next highest or lowest codec rate would take place. This approach assumes that the initial rate of samples output by the codec is very close to bandwidth allocation rates of the data channel. A large mismatch in these parameters may result in a buffer overflow or underflow condition that is too large for correction by this technique.

As previously described, the underlying reason for the codec rate adjustment may be either too many added escape bytes, or a fundamental clock rate mismatch. Regardless of the reason for making an adjustment, this technique will work well within bounds. Generally, the buffer should be big enough to hold data so that a trend can be discerned. This is a result of the burstyness of the data transfer in and out of the buffer. Thus, the adjustment in the codec output rate should be kept small so that clear trends can be ascertained. These basic provisos are standard issues when designing any control loop.

FIG. 13 is a schematic representation of the exchange of messages and data among the data client, the importer, and the exporter. The exchange is initiated by the exporter sending a "PDU Needed" indication to the importer, thus requesting that the importer send it data. The importer also receives a Log-In and Setup Session communication from the data client, establishing a dialogue that will allow the data client to send data to the importer. A buffer is then established and filled within the data client. Thereafter, the data client responds to a Get Data Request from the importer by reading the appropriate size packets that have been generated and placed in the buffer and sending the packets to the importer (the Get Data Response). The importer in turn formats the data into a PDU that is sent to the exporter as a PDU Response. This process of generating PDU Responses continues for as long as the data client has data to be broadcast. In order to mitigate effects from mismatched clocks and the non-exact bandwidth of RLS within the HD Radio data channel, the control module can be employed to increase the codec rate if the buffer begins to deplete, or decrease the codec rate if the buffer begins to build up. This control loop allows the data application to continue without interruption and without regard for exact clock matching or non-deterministic RLS bandwidth effects, so long as the bit-rate of the codec can be switched phase continuously.

While the present invention has been described in terms of its preferred embodiment, it will be understood by those skilled in the art that various modifications can be made to the described embodiments without departing from the scope of the invention as set forth in the claims.

What is claimed is:

1. An apparatus for controlling a data rate in a digital audio broadcasting system comprising:
    a buffer for storing streaming service data clocked at a first data rate;
    a bit rate controllable, phase continuous codec for compressing the streaming service data received from the buffer to produce compressed data, wherein the codec is phase continuous at bit rate changes in codec output;
    an importer requesting streaming service data from the codec at a second data rate different from the first data rate;
    an exporter to multiplex the streaming service data with digital audio data to generate multiplexed data in an output signal; and
    a control module for controlling a bit rate of the codec in response to a level of the streaming service data in the buffer, wherein the control module compares the level of the streaming service data in the buffer to a first threshold level and reduces the bit rate of the codec when the level of the streaming service data in the buffer exceeds the first threshold level.

2. The apparatus of claim 1, wherein the control module further compares the level of the streaming service data in the buffer to a second threshold level and increases the bit rate of the codec when the level of the streaming service data in the buffer is below the second threshold level.

3. The apparatus of claim 1, wherein the control module compares the level of the streaming service data in the buffer to a first threshold level and suspends data requests when the level of the streaming service data in the buffer is above the first threshold level.

4. The apparatus of claim 1, further comprising:
    a buffer manager for reading the streaming data from the buffer in response to data requests and for sending the streaming service data to the codec.

5. The apparatus of claim 4, wherein the buffer manager includes a locking mechanism to ensure that an amount of streaming service data in the buffer is preserved.

6. The apparatus of claim 1, further comprising:
    a transmitter for transmitting the compressed data in the radio link subsystem in a digital audio broadcasting system.

7. The apparatus of claim 1, wherein the streaming data is formatted according to a non-deterministic bandwidth allocation algorithm.

8. The apparatus of claim 7, wherein the non-deterministic bandwidth allocation algorithm uses framing that inserts escape characters into the streaming service data, which is dependent on the streaming service data content.

9. A method for controlling a data rate in a digital audio broadcasting system comprising:
    storing streaming service data clocked at a first data rate in a buffer;
    using a bit rate controllable, phase continuous codec to compress the streaming service data read from the buffer, wherein the codec is phase continuous at bit rate changes in codec output; and
    controlling a bit rate of the codec in response to a level of the streaming service data in the buffer;
    multiplexing the streaming service data with digital audio data to generate multiplexed data in an output signal;
    requesting streaming service data from the codec at a second data rate different from the first data rate; and
    outputting the compressed data, wherein the step of controlling the bit rate of the codec comprises reducing the bit rate when the level of the streaming service data in the buffer exceeds a first threshold level.

10. The method of claim 9, wherein the step of controlling the bit rate of the codec further comprises:
    increasing the bit rate when the level of the streaming service data in the buffer is below a second threshold level.

11. The method of claim 9, wherein the step of controlling the bit rate of the codec comprises:
    suspending data requests when the level of the streaming service data in the buffer exceeds a first threshold level.

12. The method of claim 9, further comprising:
    reading the streaming service data from the buffer in response to data requests.

13. The method of claim 9, wherein the streaming service data is formatted according to a non-deterministic bandwidth allocation algorithm.

14. The method of claim 13, wherein the non-deterministic bandwidth allocation algorithm uses framing that inserts escape characters into the streaming service data, which is dependent on the streaming data content.

15. A method for controlling a data rate in a digital audio broadcasting system comprising:
    storing streaming service data clocked at a first data rate in a buffer;
    reading the streaming service data from the buffer;
    using a bit rate controllable, phase continuous codec to compress the streaming service data read from the buffer, wherein the codec is phase continuous at bit rate changes in codec output;
    multiplexing the streaming service data with digital audio data to generate multiplexed data in an output signal;
    requesting streaming service data from the codec at a second data rate different from the first data rate; and
    outputting compressed data at a rate controlled in response to a level of the streaming service data in the buffer, wherein the rate is reduced when the level of the data in the buffer exceeds a first threshold level.

16. The method of claim 15, wherein the rate is increased when the level of the streaming service data in the buffer is below a second threshold level.

17. The method of claim 15, wherein data requests are suspended when the level of the streaming service data in the buffer exceeds a first threshold level.

18. The method of claim 15, further comprising:
    transmitting the compressed data in a radio link subsystem in a digital audio broadcasting system.

19. The method of claim 15, wherein the streaming service data is formatted according to a non-deterministic bandwidth allocation algorithm.

20. The method of claim 19, wherein the non-deterministic bandwidth allocation algorithm uses framing that inserts escape characters into the streaming service data, which is dependent on the streaming service data content.

* * * * *